(12) United States Patent
Page et al.

(10) Patent No.: US 9,690,368 B2
(45) Date of Patent: Jun. 27, 2017

(54) CUSTOMIZATION BASED ON PHYSIOLOGICAL DATA

(75) Inventors: Alison Page, Nürnberg (DE); Leon David Imas, Portland, OR (US); Felix Muehlschlegel, Nuremberg (DE)

(73) Assignee: adidas AG, Herzogenaurach (DE)

( * ) Notice: Subject to any disclaimer, the term of this patent is extended or adjusted under 35 U.S.C. 154(b) by 1140 days.

(21) Appl. No.: 13/340,899

(22) Filed: Dec. 30, 2011

(65) Prior Publication Data

US 2013/0173413 A1 Jul. 4, 2013

(51) Int. Cl.
*G06F 3/01* (2006.01)
*G06Q 30/06* (2012.01)

(52) U.S. Cl.
CPC ......... *G06F 3/011* (2013.01); *G06Q 30/0621* (2013.01)

(58) Field of Classification Search
None
See application file for complete search history.

(56) References Cited

U.S. PATENT DOCUMENTS

| | | | |
|---|---|---|---|
| 4,745,290 A * | 5/1988 | Frankel et al. | 250/559.17 |
| 5,561,932 A * | 10/1996 | Bracken | 40/638 |
| 6,026,376 A | 2/2000 | Kenney | |
| 6,084,581 A | 7/2000 | Hunt | |
| 6,240,251 B1 | 5/2001 | Smart et al. | |
| 6,381,583 B1 | 4/2002 | Kenney | |
| 6,504,571 B1 * | 1/2003 | Narayanaswami et al. | 348/231.99 |
| 6,885,998 B1 | 4/2005 | Arduino | |
| 7,249,067 B2 | 7/2007 | Doerksen et al. | |
| 7,395,220 B2 * | 7/2008 | Abrams et al. | 705/6 |
| 7,461,012 B2 | 12/2008 | Elberbaum et al. | |

(Continued)

FOREIGN PATENT DOCUMENTS

| | | |
|---|---|---|
| DE | 102007057969 | 6/2009 |
| DE | 102009018506 | 10/2010 |

(Continued)

OTHER PUBLICATIONS

Seckington, "Nike iD: Design Your Own Shoes," Apr. 3, 2008, "https://web.archive.org/web/20080506082706/http://missgeeky.com/2008/04/03/nike-id-design-your-own-shoes/".*

(Continued)

*Primary Examiner* — Kathleen Palavecino
*Assistant Examiner* — Lance Cai
(74) *Attorney, Agent, or Firm* — Kilpatrick Townsend & Stockton LLP

(57) ABSTRACT

Product and/or item customization based on physiological data is described. One or more sensors worn by a person or a group of people and/or attached with one or more items may generate sensor data. Data characterizing one or more physiological attributes of the person or group may be determined based at least in part on the generated sensor data. Item customization may include a customized design. For example, the customized design may include one or more personalized graphics generated based on the physiological data, and/or one or more customized item components with parameters set based on the physiological data. The customized design may be provided to an item customization facility for presentation, assembly and/or manufacture. Item customization may further include selecting for consideration a set of matching items based at least in part on the physiological data.

19 Claims, 11 Drawing Sheets

(56) References Cited

U.S. PATENT DOCUMENTS

| | | | |
|---|---|---|---|
| 7,685,234 B2 | 3/2010 | Gottfried | |
| 7,801,763 B2 | 9/2010 | Sidlo et al. | |
| 7,809,601 B2 | 10/2010 | Shaya et al. | |
| 7,836,050 B2* | 11/2010 | Jing et al. | 707/728 |
| 7,933,955 B2 | 4/2011 | Khalatian | |
| 8,538,973 B1* | 9/2013 | Gonzalez et al. | 707/758 |
| 2003/0027121 A1 | 2/2003 | Grudnitski et al. | |
| 2003/0074253 A1 | 4/2003 | Scheuring et al. | |
| 2003/0078859 A1 | 4/2003 | Coke et al. | |
| 2004/0010522 A1 | 1/2004 | Shulok | |
| 2004/0133542 A1 | 7/2004 | Doerksen et al. | |
| 2005/0044025 A1 | 2/2005 | Tutty et al. | |
| 2005/0177453 A1 | 8/2005 | Anton et al. | |
| 2005/0289018 A1 | 12/2005 | Sullivan et al. | |
| 2006/0111976 A1 | 5/2006 | Pompushko | |
| 2006/0122895 A1 | 6/2006 | Abraham et al. | |
| 2007/0039209 A1* | 2/2007 | White et al. | 36/97 |
| 2007/0106670 A1 | 5/2007 | Yoakum et al. | |
| 2007/0192183 A1 | 8/2007 | Monaco et al. | |
| 2007/0271297 A1* | 11/2007 | Jaffe et al. | 707/104.1 |
| 2008/0097842 A1 | 4/2008 | Tirmala et al. | |
| 2008/0177619 A1 | 7/2008 | Sugahara | |
| 2008/0201603 A1 | 8/2008 | Ritz et al. | |
| 2009/0019648 A1 | 1/2009 | Jones et al. | |
| 2009/0157799 A1 | 6/2009 | Sukumaran et al. | |
| 2009/0198571 A1 | 8/2009 | Hanechak et al. | |
| 2009/0216633 A1* | 8/2009 | Whitsett et al. | 705/14 |
| 2010/0121739 A1 | 5/2010 | McCarthy | |
| 2010/0259473 A1 | 10/2010 | Sakata et al. | |
| 2010/0269072 A1 | 10/2010 | Sakata et al. | |
| 2010/0299616 A1* | 11/2010 | Chen et al. | 715/753 |
| 2010/0318442 A1 | 12/2010 | Paul et al. | |
| 2011/0004524 A1 | 1/2011 | Paul et al. | |
| 2011/0010274 A1 | 1/2011 | Sidlo et al. | |
| 2011/0050656 A1 | 3/2011 | Sakata et al. | |
| 2011/0054809 A1* | 3/2011 | Templeman | 702/44 |
| 2011/0055054 A1 | 3/2011 | Glasson | |
| 2011/0099047 A1 | 4/2011 | Weiss et al. | |
| 2011/0137678 A1 | 6/2011 | Williams | |
| 2011/0184949 A1* | 7/2011 | Luo | 707/737 |
| 2011/0246509 A1 | 10/2011 | Migita et al. | |
| 2012/0123867 A1 | 5/2012 | Hannan | |
| 2012/0191492 A1* | 7/2012 | Diba et al. | 705/6 |
| 2013/0013439 A1 | 1/2013 | Smullen et al. | |
| 2013/0066804 A1 | 3/2013 | Michael et al. | |
| 2013/0110666 A1 | 5/2013 | Aubrey | |
| 2013/0173389 A1 | 7/2013 | Page et al. | |
| 2013/0173414 A1 | 7/2013 | Page et al. | |
| 2013/0254067 A1 | 9/2013 | Pirbhai | |
| 2013/0290324 A1* | 10/2013 | Gibergues et al. | 707/731 |
| 2013/0297420 A1 | 11/2013 | Roberts et al. | |
| 2013/0346117 A1 | 12/2013 | Fields et al. | |
| 2014/0040007 A1 | 2/2014 | Relyea, Jr. et al. | |
| 2014/0129373 A1 | 5/2014 | Menipaz | |

FOREIGN PATENT DOCUMENTS

| | | |
|---|---|---|
| EP | 0823696 | 2/1998 |
| JP | 2004118269 | 4/2004 |
| JP | 2005354655 | 12/2005 |
| WO | 9202008 | 2/1992 |
| WO | 2006085385 | 8/2006 |
| WO | 2011002787 | 1/2011 |
| WO | 2011049251 | 4/2011 |

OTHER PUBLICATIONS

MyLocker.net, published May 2, May 24 and Aug. 16, 2007, retrieved from the wayback machine: https://web.archive.org on Aug. 12, 2014, 3 pages.

Extended European Search Report in related EP Application No. EP 12196928 dated Apr. 2, 2013, 7 pages.

http://www.fluid-blog.com/2009/05/15miadidas/com-site-review, May 15, 2009.

European Patent Application No. 20120190307, Extended Search Report, issued Sep. 9, 2013, 6 pages.

European Patent Application No. 20120196923, Extended Search Report, issued Apr. 3, 2013, 7 pages.

European Patent Application No. 20120196932, Extended Search Report, issued Apr. 3, 2013, 6 pages.

Fachen et al., "Customer-Led Online Open Innovation of Consumer Goods: A Multiple-Case Study", Management and Service Science (MASS), International Conference on, IEEE, Aug. 12, 2011, pp. 1-4.

Marmasse et al., "Location-Aware Information Delivery with ComMotion", Lecture Notes in Computer Science/Computational Science, Springer, DE, vol. 1927, Sep. 25, 2000, pp. 157-171.

Nakatsuru et al., "Context-Aware Information Provision to the Mobile Phone Standby Screen", Mobile Data Management, 7th International Conference, IEEE, 2006, 7 pages.

Takeuchi et al., "CityVoyager: An Outdoor Recommendation System Based on User Location History", J. Ma et al. (Eds.): UIC 2006, LNCS 4159, pp. 625-636.

* cited by examiner

CUSTOMIZATION BASED ON PHYSIOLOGICAL DATA

CROSS-REFERENCES TO RELATED APPLICATIONS

This application incorporates by reference the disclosures of two co-pending U.S. patent applications. These co-pending U.S. patent applications are "Offering A Customized Collection of Products," filed by Alison Page, U.S. application Ser. No. 13/340,919, filed on Dec. 30, 2011, and "Retail System With Location-Based Customization," filed by Alison Page, U.S. application Ser. No. 13/340,870, filed on Dec. 30, 2011. The disclosures of each of these two applications are hereby incorporated herein in their entireties by this reference.

FIELD OF THE INVENTION

The invention relates to retail systems or the like.

BACKGROUND

Customized items, such as customized apparel and equipment, can provide significant benefits when undertaking a wide variety of activities. For example, customized items can help people adapt to different environmental conditions. For some activities, customized items can contribute to, and even enhance, performance. For example, customizing the size of a sporting item to an individual user, e.g. to the specific size, weight or body measurements of an athlete, results in a sporting item that has an optimal fit for this particular athlete, thereby leading to an improved usability during a sports activity and hence to improved performance of the athlete. Such items can be highly valued, so that item creators can invest significant resources in the design, manufacture and distribution of the items, and item users can invest significant resources in the item selection and acquisition process. However, conventional creation and acquisition processes for customized items have shortcomings.

Some conventional item design and/or manufacturing processes fail to provide for sufficient customization options such as unique customization. For example, graphical customization can have a performance aspect with respect to some activities, and/or aid item identification. Where customization has a motivational aspect, insufficient customization options can be detrimental with respect to the motivational aspect. Where customization has a performance aspect, insufficient customization options can be detrimental with respect to the performance aspect. For example, some conventional item manufacturing processes are designed to produce items having a relatively small set of standardized sizes, shapes and/or performance properties. When the best fit for an item user is not one of this set, the item user can experience discomfort and/or a performance detriment. Some conventional item manufacturing processes produce a larger set of sizes, shapes and/or performance properties. However, as the number of options increases, it can become problematic to determine an optimal selection and/or customization for a particular item user.

BRIEF SUMMARY

Customization of items based on physiological data is enabled. One or more sensors worn by a person or a group of people and/or attached with one or more items may generate sensor data. Data characterizing one or more physiological attributes of the person or group may be determined based at least in part on the generated sensor data. Item customization may include a customized design. For example, the customized design may include one or more personalized graphics generated based on the data characterizing the physiological attributes of the person, and/or one or more customized item components with parameters set based on the data characterizing the physiological attributes of the person. The customized design may be provided to an item customization facility for presentation, assembly and/or manufacture.

Item customization may further include selecting for consideration, from a set of available items (which may be relatively large), a set of matching items based at least in part on (e.g., matching) the data characterizing the physiological attributes of the person. The set of matching items may be provided for presentation to the person. The selection of the matching items may be implemented, at least in part, by a recommendation engine incorporated into a computer-controlled system.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Same numbers are used throughout the disclosure and figures to reference like components and features.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment of the invention, products and/or items (collectively, "items"), including sporting items and fashion items such as apparel and equipment, may be customized based on physiological attributes of a person or groups of people. For example, item customization may include customizing the item with a customized design, customization of graphics on item surfaces and/or customization of item components (e.g., with respect to shape and/or one or more component materials properties). The person or group may undertake an activity and associated sensors (e.g., worn sensors and/or sensors attached with an item) may generate data during the activity. The generated sensor data may be analyzed (e.g., statistically) to determine one or more physiological attributes of the person or group. The item customization may be based on the sensor data and/or the person's determined physiological attributes. For example, the design including graphics may be generated based on templates having parameters with values set based on the sensor data and/or the physiological attributes. In accordance with at least one embodiment of the invention, the generated design and/or graphic may be unique with respect to the sensor data and/or the physiological attributes. Alternatively, or in addition, generated designs and/or graphics may include icons and/or characters corresponding to physiological attribute types and/or physiological performance levels. Any suitable product and/or item may incorporate the customized design.

In accordance with at least one embodiment of the invention, item customization may further include assisted selection from a set of pre-determined item configurations based on the determined physiological attributes of the person. For example, sporting footwear may be customized based on one or more attributes of the person's running gait. The person's determined physiological attributes may be categorized and matched to categories of the desired type of item. Item configurations matching the person's physiological attributes may be selected and presented to the person for consideration. Presented items may be ranked with respect to suitability. Ranking factors in addition to physiological attributes may be taken into account including item use goals, expected use environments, expected activity durations, expected activity intensity levels, characterizations of previously used items of a same and/or similar item type, and injury characterizations.

Figure 1:
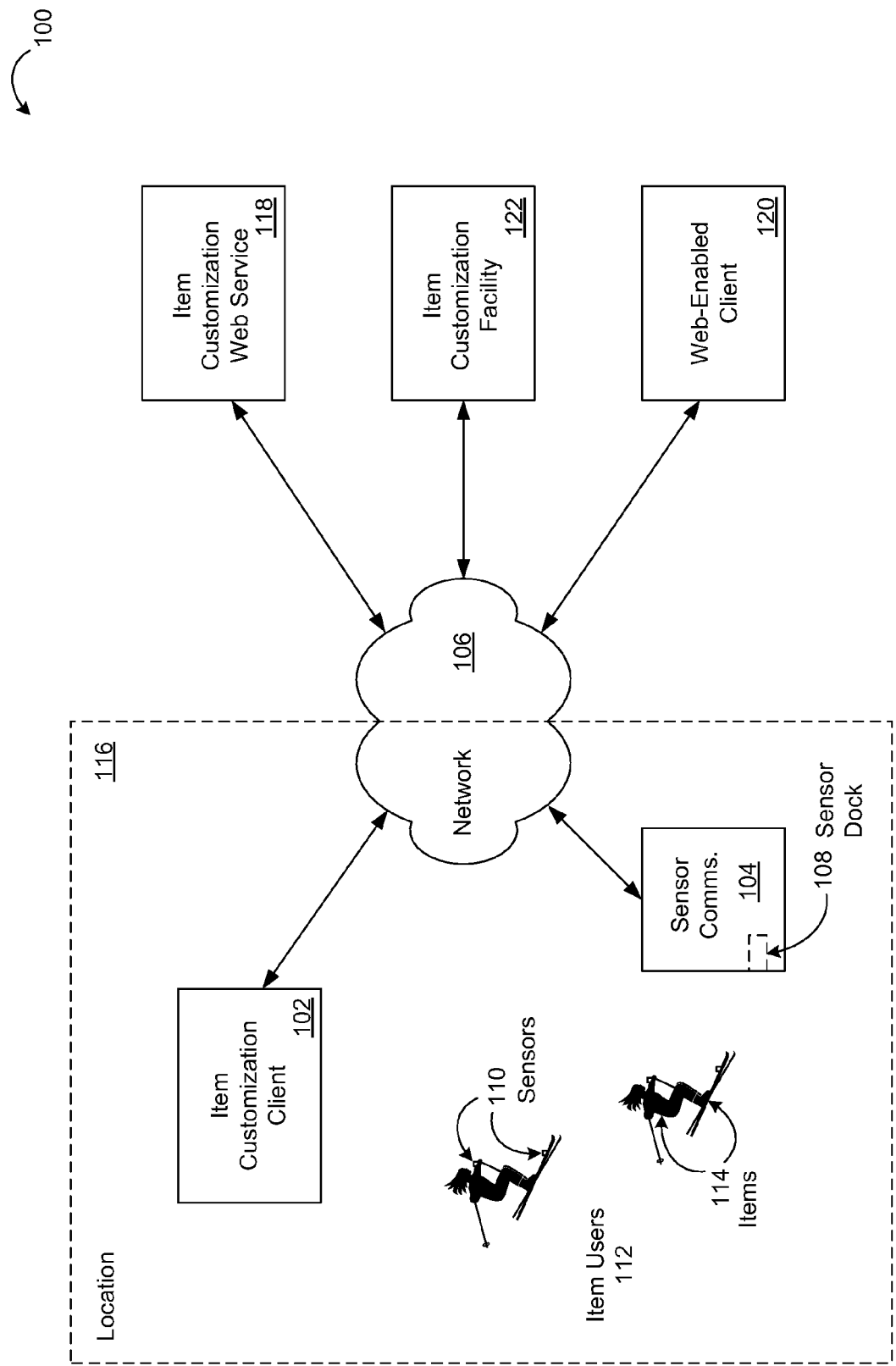
FIG. 1 is a schematic diagram depicting an example computer networking environment in accordance with at least one embodiment of the invention.

In accordance with at least one embodiment of the invention, an item customization client and/or application (sometimes called an "app") is provided to assist an item user with customization. The item customization client may incorporate and/or be incorporated by a computer and/or computing device, including any suitable mobile device, and may operate within a computer networking environment. Examples of suitable mobile devices include suitable devices having an ability to communicate information such as cell phones, smart phones, personal communication service ("PCS") telephones, personal digital assistants ("PDAs"), palmtop computers, laptops/notebooks, tablet computers, handheld video games, multi-media enabled devices, mobile desktop/workstation computing device, wireless modems, digital still/video cameras, handheld devices that include short range radios (such as radios operating in accordance with an IEEE 802.11 or Bluetooth® standard), or other similar electronic devices that are network capable. FIG. 1 depicts example aspects of a computer networking environment 100 in accordance with at least one embodiment of the invention. The example environment 100 includes an item customization client 102 communicatively connected with a sensor communications component 104 through a network 106. The sensor communications component 104 may include a sensor docking port 108 suitable for physically receiving a one or more types of sensor such as sensors 110. Alternatively, or in addition, the sensor communications component 104 may communicate wirelessly with the sensors 110 and/or facilitate communication of the sensors with network 106 connected components of the environment 100. As shown in FIG. 1, sensors 110 may be worn by users 112 of items 114 and/or be attached with (or embedded in) one or more items 114.

In the example depicted in FIG. 1, the item customization client 102, the sensor communication component 104, the sensor(s) 110, the item(s) 114, and part of the network 106 is shown in a location 116. For example, the location 116 may be a sporting activity location and/or item customization location such as a sports field, a running route, an item retail location and/or an item user's 112 home. However, concurrent presence in a single location is not necessary in each suitable environment. One or more item users 112 may perform an activity while wearing one or more sensors 110 and/or while utilizing one or more items 114 with a sensor 110 attached or embedded. The sensor(s) 110 may communicate with the sensor communications component 104 (e.g., wirelessly and/or via the sensor dock 108). Sensor data and/or data characterizing physiological attributes of the item users 112 may be transferred to the item customization client 102. The item customization client 102 may present customized designs including customized graphics to the item users 112 and/or activity spectators. Sensor data associated with any suitable number of item users 112 may be collected, including one user, hundreds of users, thousands of users and more. Item users 112 need not be utilizing the items 114 during sensor data collection.

In some locations, item users 112 may interact with the item customization client 102 to customize items 114 based on the sensor data and/or the data characterizing the physiological attributes of the item users 112, for example, with the presented customized design. When the location 116 is a staffed item customization location, a staff member and/or an associate may assist the item user(s) 112. In accordance with at least one embodiment of the invention, the item customization client 102 may be configured to be operated by such an associate while assisting multiple item users 112.

The items 114 may include any suitable product, item of apparel, equipment or set of item components. For example, items 114 may include sporting items and fashion items such as footwear, legwear, a top, armwear, headgear, underwear, a swimsuit, a coat, a jacket, a belt, a necklace, a backpack, a sports bag, a ball, one or more golf clubs, a baseball bat, a hockey stick, a surfboard, a skateboard, roller skates, ice skates, and/or exercise equipment. In particular, as used herein, the term "item" includes a matched pair of left and right item components such as left and right shoes, left and right gloves, and so on.

The sensors 110 may include any suitable type of sensor or set of sensor components. For example, the sensors 110 may include one or more sensor components such as a heart rate sensor, an electrocardiogram (ECG) sensor, a respiratory sensor such as a respiratory sensor capable of measuring a respiratory rate, a respiratory volume, a rate of respiratory carbon dioxide production ($VCO_2$) and/or a rate of respiratory oxygen consumption ($VO_2$), a blood oxygen level sensor, a hydration level sensor, a position sensor, a displacement sensor, a velocity sensor, an acceleration sensor such as an accelerometer, an electromagnetic sensor such as a photoelectric sensor, a level sensor, a load sensor, a temperature sensor, a pressure sensor, an humidity sensor, a moisture sensor, an electrochemical sensor such as an electrochemical gas sensor, an acoustic sensor such as a microphone, and/or a vibration sensor. The sensors 110 may be worn by the item users 112, be removably attached with the items 114 and/or incorporated into the items 114. For example, one or more of the sensors 110 may be battery powered, and the sensor communication component 104 may be further configured to charge the sensor 110 while docked, with the sensor 110 being attached to an item of apparel 114 during data collection. Alternatively, or in addition, the sensor 110 may communicate wirelessly with the sensor communication component 104 and/or the item customization client 102 without docking.

Figure 10:
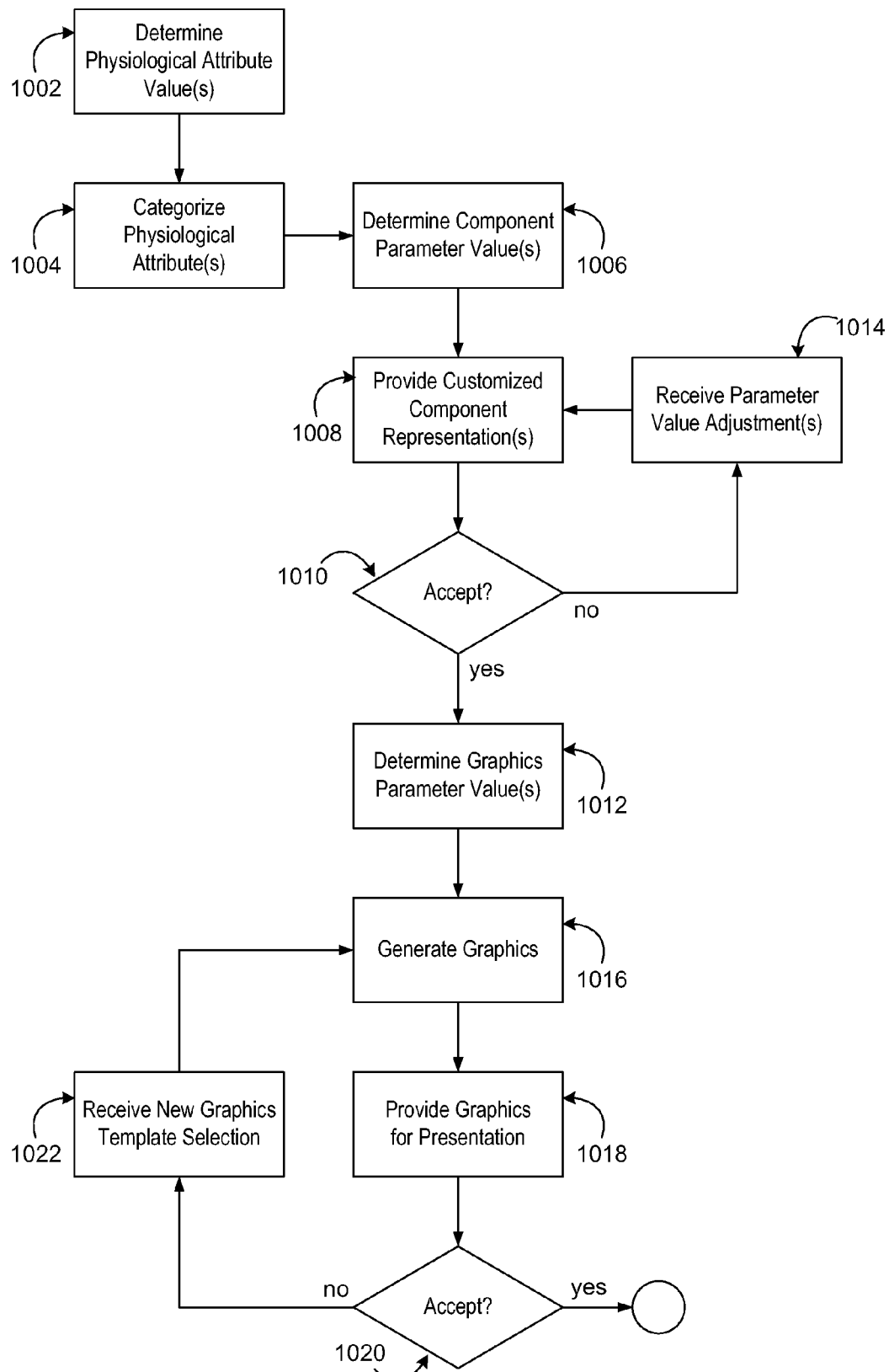
FIG. 10 is a flowchart depicting example steps for item customization in accordance with at least one embodiment of the invention.

The item customization client 102 and the sensor communications component 104 may incorporate and/or be incorporated by one or more computers. An example computer in accordance with at least one embodiment of the invention is described below with reference to FIG. 10. Although the example environment 100 shows the sensor communications component 104 communicatively connected to the item customization client 102 through the network 106, in accordance with at least one embodiment of the invention, the item customization client 102 and the sensor communication component 104 may be integrally incorporated into a single unit so that communication over the network 106 is unnecessary. The network 106 may incorporate any suitable set of computer networking components including wired and wireless communication transmission media, routers, switches, hubs, gateways, firewalls, modems, bridges, computers, private computer networks and public computer networks such as the Internet. An example item customization client 102 is described in more detail below with reference to FIG. 4.

The computer networking environment 100 may further include an item customization web service 118. For example, the item customization web service 118 may be hosted by one or more computers that are remote from the location 116. The item customization web service 118 may receive customization data collected by the item customization client 102, including customization data corresponding to multiple item users 112. The item customization web service 118 may provide each item user 112 secure access to corresponding customization data collected at the location 116, for example, with a web-enabled client 120. The item customization web service 118 may further be configured to provide an available set of customization options to the item customization client 102. There may be multiple locations such as the location 116, and the item customization web service 118 may be configured to collect data from, and provide data to, each location.

As will be apparent to one of skill in the art, the item customization web service 118 may be implemented at least in part with one or more web servers (e.g., hypertext transfer protocol or HTTP servers), and the web-enabled client 120 may incorporate, and/or be incorporated by, one or more web browsers or web browser components (e.g., HTTP clients). An example item customization web service 118 is described below in more detail with reference to FIG. 5.

The computer networking environment 100 may further include an item customization facility 122 communicatively connected to the network 106. For example, the item customization facility 122 may include item manufacturing facilities configured to customize items in accordance with a custom design specified by the item customization client 102 and/or the item customization web service 118. The item customization facility 122 may include a presentation device configured to present the custom design, or a representation thereof. For example, the presentation device may display, in "real-time", a continuously updated custom design to the item users 112 based at least in part one or more streams of data generated by the sensors 110 and/or associated streams of data characterizing physiological attributes of users 112. Accordingly, custom designs may be part of a sporting activity in which the item users 112 are participating, as well as being utilized to customize items 114, for example, post-activity. Custom designs may include custom designs corresponding to individual item users 112, as well as custom designs corresponding to groups of item users 112 including, for example, all participants in a particular sporting event.

Figure 2:
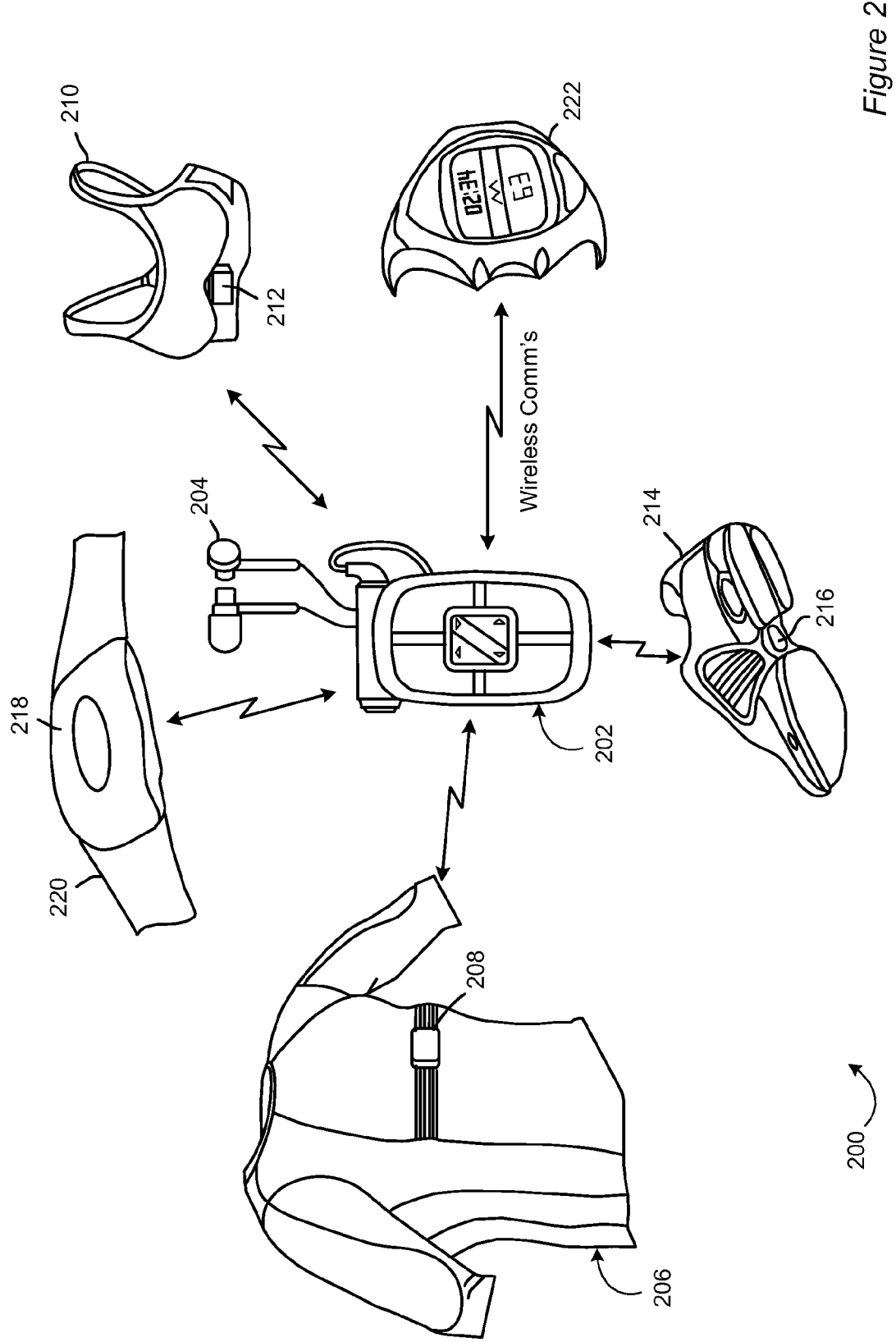
FIG. 2 is a schematic diagram depicting aspects of example apparatus in accordance with at least one embodiment of the invention.

The computer network environment 100 may incorporate a wide variety of suitable apparatus. FIG. 2 illustrates aspects of example apparatus 200 in accordance with at least one embodiment of the invention. The example apparatus 200 includes a mobile phone 202 having earphones 204 and a sports operating mode, a sports shirt 206, having an integral or attachable heart rate or respiratory monitor 208 and/or additional sensors, a sports bra 210 having an integral or attachable heart rate monitor 212 and/or additional sensors, an athletic shoe 214 that includes a motion monitor 216, a heart rate monitor 218 integral or attached to a chest strap 220, and a sports watch 222 incorporating and/or corresponding to one or more sensors. The apparatus 200 may be a modular system of interconnected and interactive components and products. These components and products may be acquired individually and over time as desired.

In accordance with at least one embodiment of the invention, the mobile phone 202 includes functionality typically available in a cell phone, and it is capable of playing music files (e.g., MP3 music files). In addition, the mobile phone 202 includes a sports operating mode. When placed in the sports operating mode, selected buttons and keys of the mobile phone 202 are operable to select various sports operating mode functions including receiving and/or collecting data from one or more of the sensors 208, 212, 216, 218, 222. Such data may be received through any suitable communications path including the illustrated wireless communications paths. The mobile phone 202 is an example of the sensor communication component 104 of FIG. 1. The sensors 208, 212, 216, 218, 222 of FIG. 2 are examples of the sensors 110 of FIG. 1. The items 206, 210, 214, 220, 222 of FIG. 2 are examples of the items 114 of FIG. 1.

Figure 3:
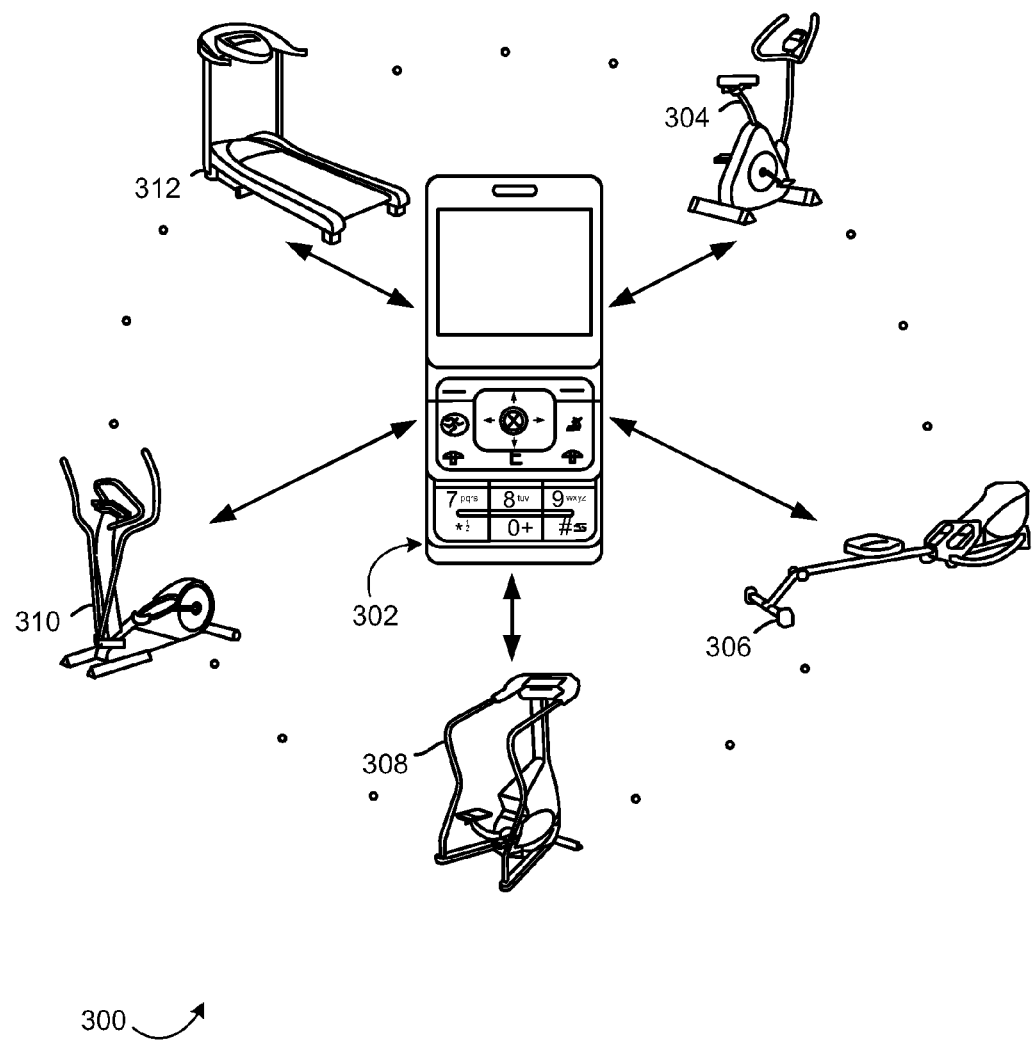
FIG. 3 is a schematic diagram depicting aspects of example apparatus in accordance with at least one embodiment of the invention.

As well as wearable and/or relatively portable items, items 114 (FIG. 1) associated with sensors may be less portable. FIG. 3 depicts aspects of example apparatus 300 in accordance with at least one embodiment of the invention. The example apparatus 300 includes a portable electronic processing device 302 interacting with various exercise machines. As shown in FIG. 3, examples of such exercise machines can include an exercise bike 304, a rowing machine 306, a stair climber 308, an elliptical machine 310, and/or a tread mill 312. The mobile phone 202 of FIG. 2 is an example of the portable electronic processing device 302 of FIG. 3. The exercise machines 304, 306, 308, 310, 312 of FIG. 3 are examples of the items 114 of FIG. 1.

The portable electronic processing device 302 interacts with the various exercise machines, for example, by receiving and storing data collected by the exercise machines. The data can include, for example, the distance run on the tread mill 312, the distance traveled on the exercise bike 304, or the distance rowed on the rowing machine 306. The data can also include, for example, the time spent exercising and/or the calories burnt while exercising. In accordance with at least one embodiment of the invention, the exercise machines include motion monitors such as, for example, one or more motion monitors similar to the ones described herein. These motion monitors are used to monitor parts of the exercise machines (e.g., a pedal of the exercise bike 304 and/or steps of a stair climbing machine 308) that move.

The data collected by the various exercise machines can be provided to the portable electronic processing device 302 using wireless communications or wired communications, for example, by placing the portable electronic processing device 302 in a docking unit (not shown in FIG. 3). In accordance with at least one embodiment of the invention, exercise routines for each of the various exercise machines, which may be tailored to an individual's fitness level, can be provided/downloaded from a computer/web server (not shown in FIG. 3) and loaded into the portable electronic processing device 302. These routines can then be provided to a particular exercise machine prior to a workout. A workout using an exercise machine is an example of an activity.

Figure 4:
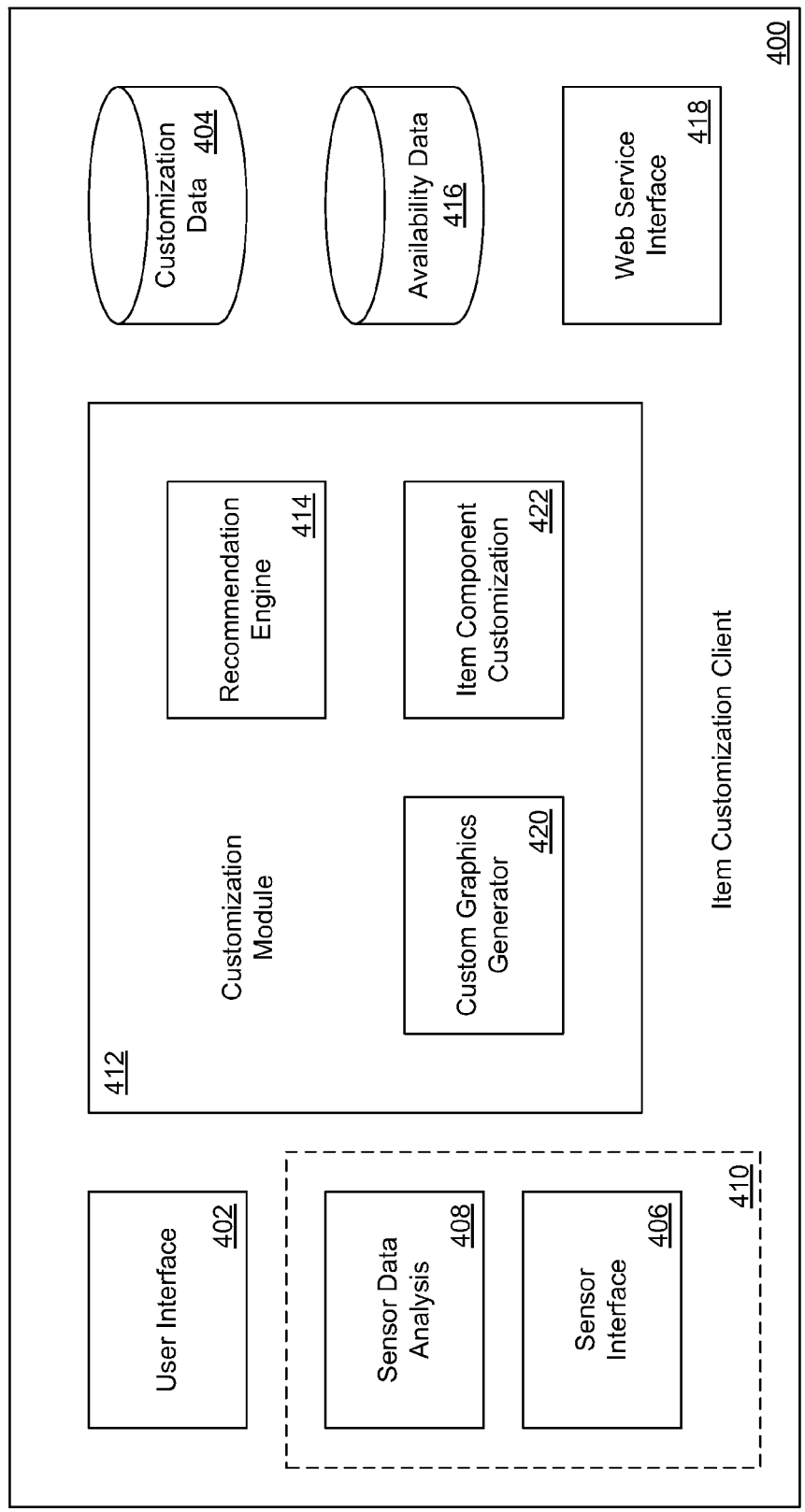
FIG. 4 is a schematic diagram depicting an example item customization client in accordance with at least one embodiment of the invention.

The item customization client 102 of FIG. 1 may provide a graphical user interface enabling an item user to customize items of one or more types. The item customization client may be configured to enable customization by one or more item users. A customization assistant may operate the item customization client on behalf of the one or more item users, for example, while the one or more item users participate in an activity. FIG. 4 depicts aspects of an example item customization client 400 in accordance with at least one embodiment of the invention. The item customization client 400 of FIG. 4 is an example of the item customization client 102 of FIG. 1.

A user of the item customization client 400 may interact with the item customization client 400 through a user interface 402. The user interface 402 may provide access to functionality of the item customization client 400. The client user may establish profiles for item users. For example, item user profiles may include identifying information such as the item user's name, item customization history including previously established custom designs, previously collected sensor data and/or physiological attribute data, goals of the item user with respect to one or more sporting items (e.g., training goals), expected item use environments (e.g., track or treadmill for sporting footwear), expected activity durations (e.g., typical durations of less than 50 minutes, 50 minutes to 1 hour, greater than 1 hour), expected activity intensity levels (e.g., on a scale of 1 to 10 where 1 is performing an activity with a minimum possible effort and 10 is performing the activity with a maximum possible effort), characterizations (e.g., ratings) of items of apparel of a same and/or similar type with which the item user has had a previous experience, and characterizations of injuries that may influence apparel choice (e.g., locations of item user muscle and/or joint injuries and degree of injury). The user interface 402 may incorporate any suitable user interface elements to facilitate input and editing of item user profiles. Item user profiles may be stored in a customization database 404.

The item customization client 400 user may interact with the user interface 402 to access and/or establish one or more sensor data collection sessions. The user interface 402 may interact with a sensor interface 406 to initiate, stop, pause and/or reset sensor data collection. For example, the sensor interface 406 may communicate over the network 106 (FIG. 1) to the sensor communications component 104 to put the sensors 110 into a data collection mode. Alternatively, or in addition, one or more of the sensors 110 may incorporate one or more user interface elements (e.g., one or more buttons) to start, stop, pause and/or reset data collection. The item customization client 400 may receive collected data from the sensors 110 through the sensor interface 406. For example, the user interface 402 may command the sensor interface 406 to initiate, stop, pause and/or reset a transfer of data collected by the sensors 110. The data collected by the sensors 110 may be stored in the customization database 404, and associated with the profile of the item user wearing the sensors 110 and/or utilizing the items 114 associated with the sensors 110.

The data collected by the sensors 110 (FIG. 1) may be analyzed by a sensor data analysis module 408. The sensor data analysis module 408 may analyze the collected sensor 110 data to determine one or more physiological attributes of the item user 112. The collected sensor 110 data may include one or more time series, and the sensor data analysis module 408 may apply suitable statistical processing to identify trends and/or patterns that correlate with human physiological attributes. For example, the sensors 110 may include an ECG sensor, and the sensor data analysis module 408 may process the raw ECG data to determine heart rate. As another example, the sensors 110 may include an accelerometer, the collected sensor data may include a time series of acceleration vectors, and the sensor data analysis module 408 may apply a model of human physiology to associate the time series of acceleration vectors with one of a set of categories of human gait (e.g., supination, protination, over-protination, neutral). The sensor data analysis module 408 may apply any suitable statistical processing technique including Bayesian, Gaussian, clustering and regression, as well as any suitable model of human physiology such as a skeletal-muscular model. Physiological attributes identified and/or determined by the sensor data analysis module 408 may be stored in the customization database 404, and associated with a corresponding item user profile. In FIG. 4, the sensor interface 406 and the sensor data analysis module 408 are surrounded by a dashed line 410 to indicate that one or more aspects of their functionality may be alternately incorporated into the sensor communications component 104 (FIG. 1) and/or the sensors 110.

The item customization client 400 may further include a customization module 412 configured at least to customize items based on one or more physiological attributes of the item user. The customization module 412 may include a custom graphics generator 420 configured at least to generate custom graphics based at least in part on one or more physiological attributes of the item user and/or any suitable aspect of the profile of the item user. For example, the custom graphics generator 420 may maintain one or more graphics templates having parameters that can be given values based at least in part on physiological attribute values and/or corresponding sensor data. The graphics templates may define sets of parameterized lines, curves, polygons, icons, images, photographs, drawings, maps, symbols, typography, geometric designs, fractals, textures, colors, color schemes, backgrounds, background patterns, tiling patterns, graphics processing effects such as blurring, filtering, speckling (e.g., adding visual noise), despeckling, smoothing, sharpening, glow effects, cropping, rotation, zooming, twisting, warping and/or any suitable graphics object or process. A custom graphic may include one or more background components and/or one or more foreground components. Components may vary in shape, size and/or color based at least in part on physiological attribute values and/or corresponding sensor data. In accordance with at least one embodiment of the invention, a user of the item customization client 400 may select from among the graphics templates by interacting with the user interface 402. The custom graphics generator 420 may provide the generated graphic in any suitable format including one or more formats suitable for presentation to the item user through the user interface 402, the web-enabled client 120 (FIG. 1), and/or the item customization facility 122 (FIG. 1). Graphics generated for an item user may be stored in the customization database 404 and associated with the profile of the item user.

The customization module 412 may further include a recommendation engine 414 configured at least to select a set of matching items from a set of available items based at least in part on one or more physiological attributes of the item user and/or any suitable aspect of the profile of the item user. For example, each item in the set of available items may be associated with a specified set or range of suitable values or categories, and the recommendation engine 414 may filter out those of the set of available items that do not match the physiological attributes and/or profile attributes. The recommendation engine 414 may further determine suitability scores for items in the set of matching items (and/or in the set of available items) based at least in part on one or more physiological attributes of the item user and/or any suitable aspect of the profile of the item user, and rank the set of matching items with respect to suitability for the item user based at least in part on the determined suitability scores. For example, the recommendation engine 414 may determine one or more score components corresponding to one or more of: physiological attributes, item use goals, expected item use environments, expected activity durations, expected activity intensity levels, characterizations of like items, and injuries, and determine a suitability score as a weighted sum of the score components.

The set of available items may be stored, at least in part, in an availability database 416. Alternatively, or in addition, the set of available items may be maintained by the item customization web service 118 (FIG. 1) and accessed through a web service interface 418. In accordance with at least one embodiment of the invention, the set of available items may be periodically replicated, at least in part, from the item customization web service 118 to the availability database 416. The availability database 416 may include characterizations and/or categorizations of the set of available items including item identity, item type, categorization with respect to human physiology and, in particular, with respect to physiological attributes identified and/or determined by the sensor data analysis module 408, as well as characterizations and/or categorizations with respect to item use goals, item use environments, activity durations, activity intensity, like items, and/or injuries.

The customization module 412 may further include an item component customization module 422 configured at least to personalize item components based at least in part on one or more physiological attributes of the item user and/or any suitable aspect of the profile of the item user. The availability database 416 may identify items having customizable components and provide item component customization templates having parameters that can be given values based at least in part on physiological attribute values and/or categorizations, as well as values and/or categorizations of any suitable aspect of the profile of the item user. For example, footwear components may have shapes with variable degrees of height, width and/or curvature. As another example, some footwear components may have materials with specifiable properties such as cushioning and/or permeability to air and/or moisture. In accordance with at least one embodiment of the invention, a user of the item customization client 400 may interact with the user interface 402 to customize one or more customizable components of an item, including varying parameter values from default and/or optimal values as determined by the item component customization module 422. Customized component specifications in a format suitable for the item customization facility 122 (FIG. 1) may be generated by the item component customization module 422, and stored in the customization database 404 associated with the profile of the corresponding item user.

Figure 5:
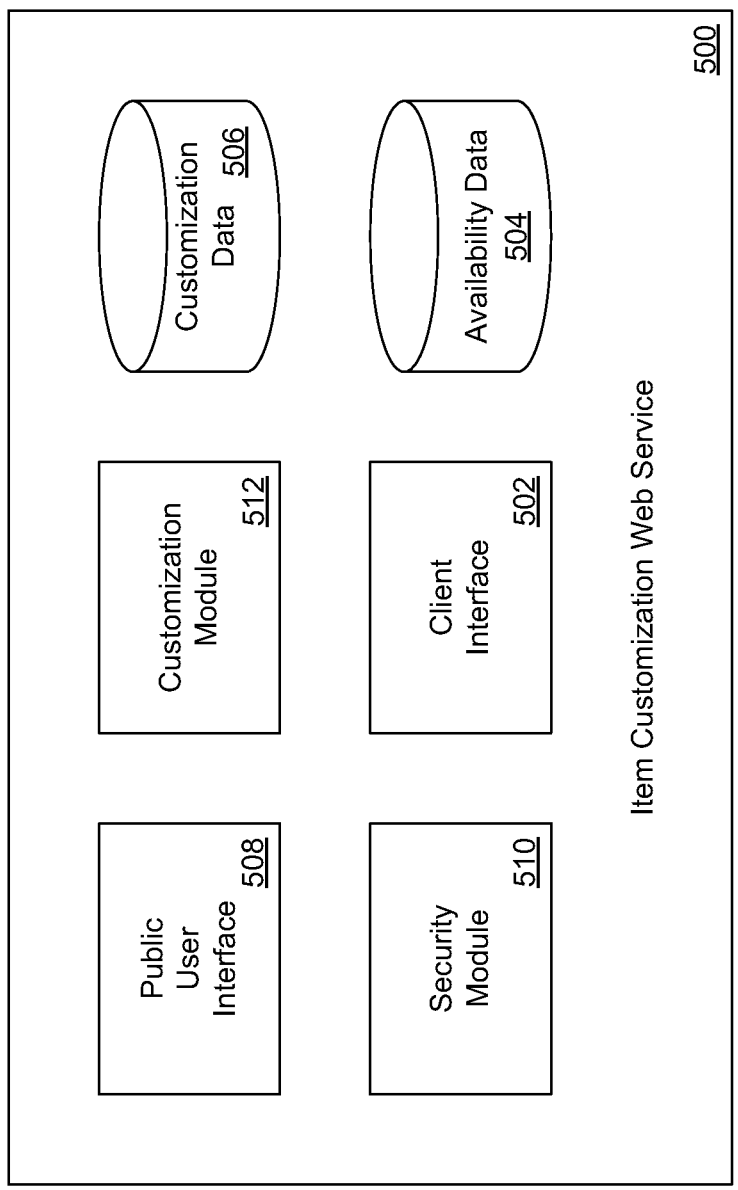
FIG. 5 is a schematic diagram depicting an example item customization web service in accordance with at least one embodiment of the invention.

The user of the item customization client 400 may interact with the user interface 402 to place orders for the manufacture and/or assembly of customized items. The orders may be placed with the item customization web service 118 (FIG. 1) and/or the item customization facility 122 through the web service interface 418. FIG. 5 depicts aspects of an example item customization web service 500 in accordance with at least one embodiment of the invention. The item customization web service 500 of FIG. 5 is an example of the item customization web service 118 of FIG. 1.

The item customization web service 500 may include a client interface 502 configured to facilitate interaction with the item customization client 400 (FIG. 4). For example, the client interface 502 may service requests placed with the item customization web service 500 through the web service interface 418. The client interface 502, and like interfaces described herein, may incorporate any suitable number of interface elements of any suitable type. For example, interface elements may correspond to programmatic objects such as function calls, to protocol messages that activate and/or participate in functionality associated with interface elements, and/or to interface elements specified with a web services description language (e.g., WSDL) and/or in accordance with an object access protocol (e.g., simple object access protocol or SOAP) and/or a representational state transfer (e.g., REST) protocol.

As described above with reference to FIG. 4, the availability database 416 at the item customization client 400 may be a replica or partial replica of a centralized availability database 504 maintained by the item customization web service 500. Similarly, the item customization web service 500 may maintain a centralized customization database 506 that stores at least a partial copy of the customization database 404 of the apparel personalization clients. Item users that have attended a personalization session (e.g., at the location 116 of FIG. 1), may then access details of the personalization session through a public user interface 508, for example, a web-based graphical user interface, using the web-enabled client 120. A security module 510 may enforce a set of security policies with respect to data access, for example, requiring authentication by an item user before allowing access to the item user's profile and/or customization session details. The item customization web service 500 may further include a customization module 512 corresponding to the customization module 412 of the item customization client 400 to enable further customization and/or to provide a consistent user experience. In accordance with at least one embodiment of the invention, the item customization web service 500, 118 may incorporate, and/or be incorporated by, the item customization client 400, 102.

Figure 6:
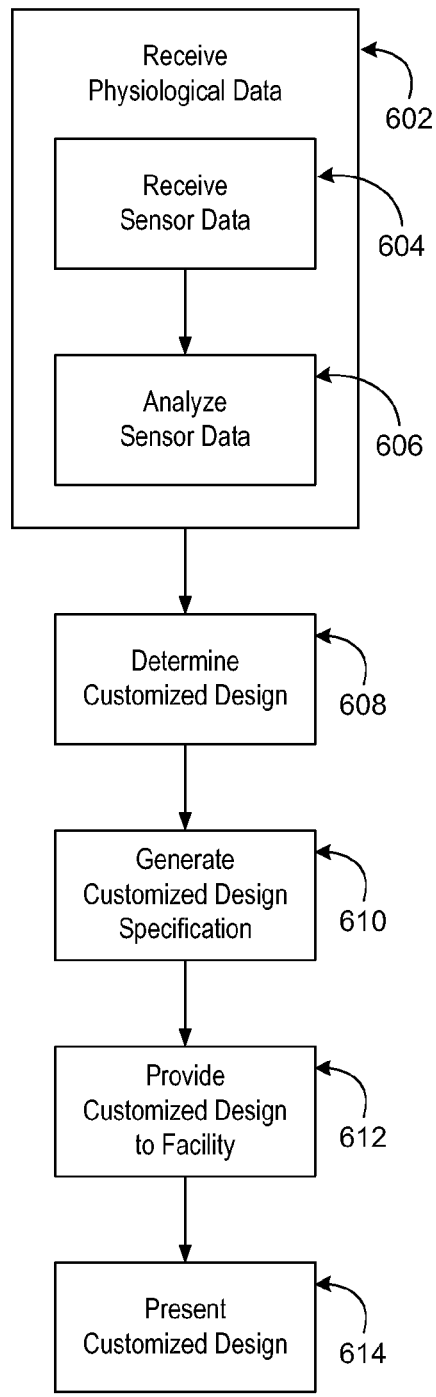
FIG. 6 is a flowchart depicting example steps for item customization in accordance with at least one embodiment of the invention.

The description now turns to procedures that may be performed in accordance with at least one embodiment of the invention. FIG. 6 depicts example steps for item customization in accordance with at least one embodiment of the invention. At step 602, data characterizing physiological attributes of one or more people may be received. For example, item users 112 (FIG. 1) may be participating in a sporting activity, and sensors 110 of various types may provide data corresponding to physiological attributes of the item users 112 that is received (at step 604) and analyzed (at step 606) to determine the data characterizing the physiological attributes of step 602. The data characterizing physiological attributes may be tagged and/or associated with one or more groups of people (e.g., sports teams), as well as individuals. For example, the sensors 110 may be associated with unique identifiers that can be associated with individuals and/or groups.

At step 608, a customized design may be determined based at least in part on the data characterizing the physiological attributes of step 602. For example, the customized design may include a customized graphic suitable for customizing an item. The item to be customized need not correspond to an item utilized by the item users 112 during the activity and/or sensor data collection session. The customized design may be determined in "real-time," for example, during the activity. In addition, the customized design may be continuously updated (at step 608) responsive to streams of physiological data received at step 602. The customized design may be updated responsive to triggers such as periodic triggers, activity stage triggers, activity type change triggers, activity progression triggers (e.g., event time elapsed/remaining, running route distance covered/remaining, etc) and activity location triggers. Alternatively, or in addition, the customized design 608 may be determined at a time removed from the receiving of the physiological and/or sensor data. For example, the physiological and/or sensor data may be stored in a computer memory and/or database for later recall. The customized design may be unique to an individual or a group, or have distinct design components corresponding to the individual and the group. For example, an item of sporting apparel customized to commemorate a sporting event may have a customized design that includes a group or team customized graphic as well as the item user's individual customized graphic.

At step 610, a customized design specification corresponding to the customized design determined at step 608 may be generated. For example, the item customization client 102 (FIG. 1) may generate a customized design specification suitable for each item customization facility such as the item customization facility 122. At step 612, the customized design specification may be provided to each item customization facility. At step 614, the customized design may be presented and/or provided for presentation. Where the item customization facility 122 includes a presentation device, a representation of the customized design in accordance with the customized design specification may be presented with the presentation device. Where the customized design of step 608 is determined and/or updated in real-time, the customized design specification and the presented representation of the customized design may also be determined and/or updated in real-time. Alternatively, or in addition, a particular customized design of a series (e.g., at a particular moment in time) may be selected, for example, with the item customization client 102.

Figure 7:
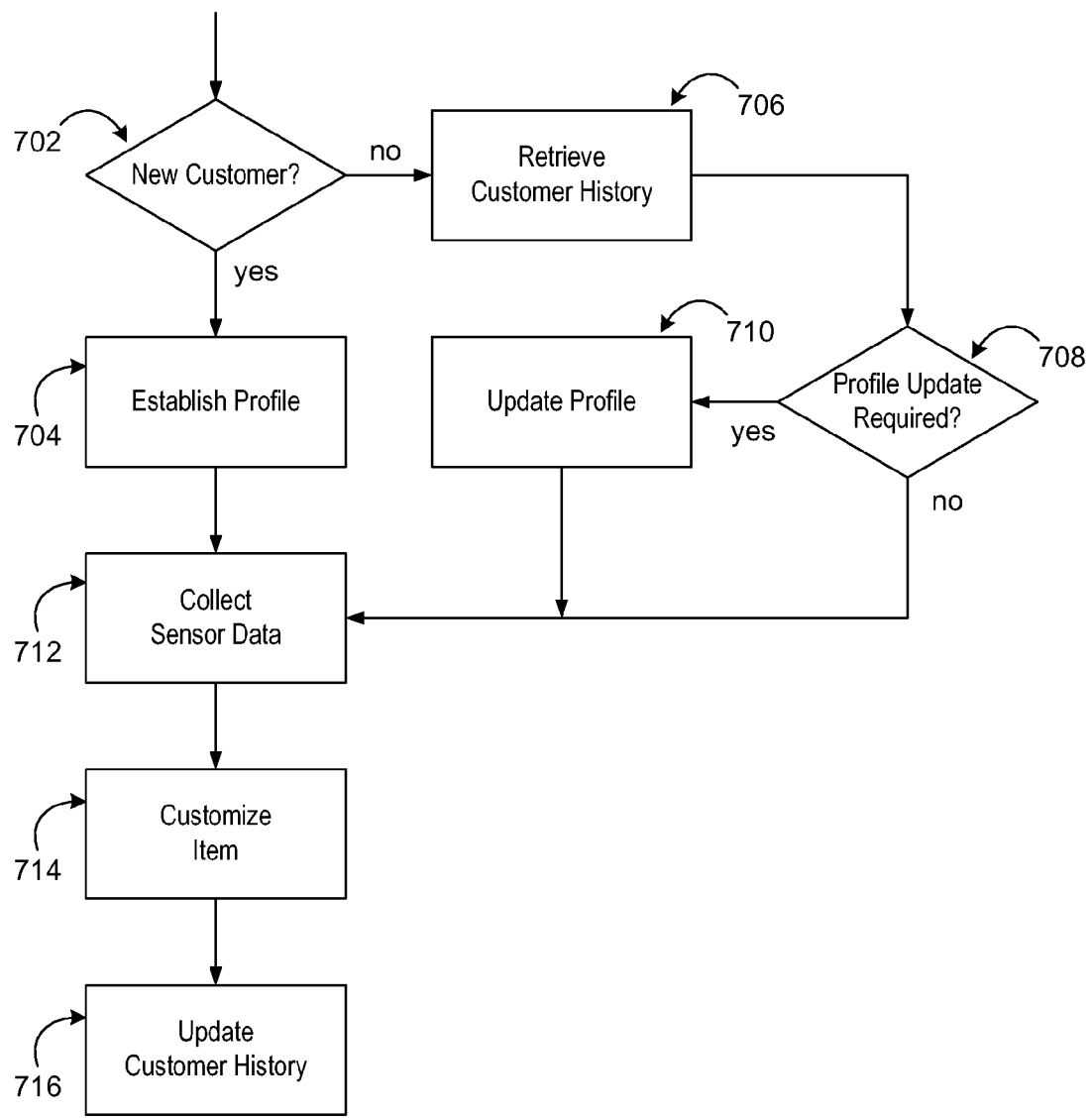
FIG. 7 is a flowchart depicting example steps for item customization in accordance with at least one embodiment of the invention.

FIG. 7 depicts example steps for sports item customization in accordance with at least one embodiment of the invention. In this example, the location 116 (FIG. 1) is a retail location, and the item user is a customer of the retail location interacting with the item customization client 102, possibly assisted by a sales associate. At step 702, it may be determined whether the item user is a new customer. For example, the user of the item customization client 102 (e.g., the item user and/or the sales associate) may explicitly so indicate with an element of the user interface 402 (FIG. 4), or the item customization client 102 may fail to find an existing profile for the item user in the local customization database 404 and/or the centralized customization database 506 (FIG. 5). If the user is a new customer, a procedure incorporating step 702 may progress to step 704. Otherwise, the procedure may progress to step 706.

At step 704, a profile may be established for the item user. For example, the user of the item customization client 102 (FIG. 1) may input profile data with the user interface 402 (FIG. 4), and the input data may be stored in the customization database 404. At step 706, instead, a customer history, including the profile, may be retrieved. For example, the user of the item customization client 102 may interact with the user interface 402 to identify the customer and retrieve the customer history from the customization database 404. At step 708, it may be determined whether a profile update is required. For example, the user of the item customization client 102 may explicitly so indicate with an element of the user interface 402. If an update is required, the procedure may progress to step 710, where the profile may be updated. Otherwise the procedure may progress to step 712. Example steps for establishing and/or updating an item user profile are described below in more detail with reference to FIG. 8.

At step 712, sensor data may be collected. For example, the user of the item customization client 102 (FIG. 1) may interact with the user interface 402 (FIG. 4) to initiate a sensor data collection session, the item user may wear a sensor 110 and/or utilize an item 114, the item user may perform an activity while the sensor 110 collects data, the sensor 110 may be docked with the sensor communications component 104, and the collected sensor data may be transferred to the item customization client 102 and stored in the customization database 404 in association with the item user profile. As an alternative to, or in addition to, physical docking of the sensor 110, collected sensor data may be transferred to the item customization client 102 through any suitable wired and/or wireless communication path. At step 714, the item and/or items of that type may be customized. Example steps for item customization in accordance with at least one embodiment of the invention are described below in more detail with reference to FIG. 9 and FIG. 10. At step 716, the customer history associated with the item user may be updated. For example, the customer history associated with the item user in the customization database 404 may be updated with data reflecting the customization activity of step 714.

Figure 8:
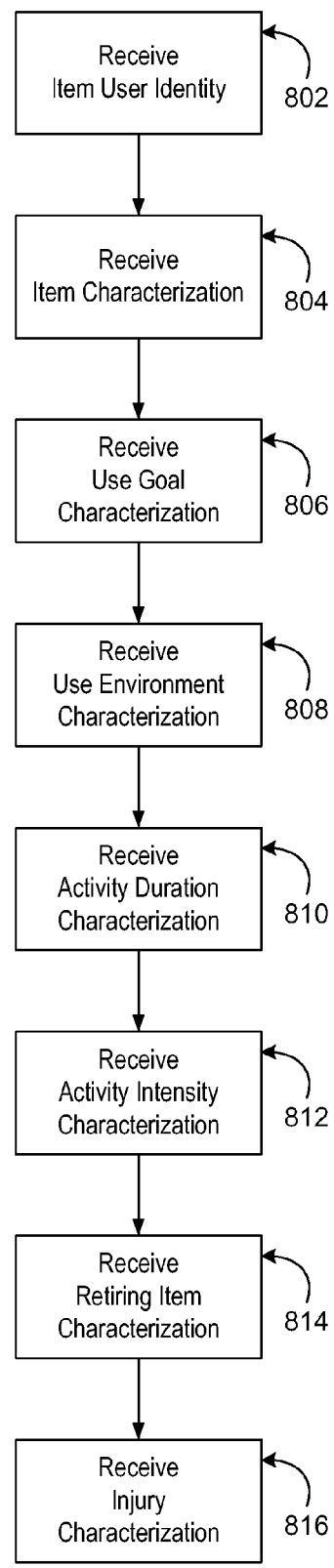
FIG. 8 is a flowchart depicting example steps for establishing and/or updating a user profile in accordance with at least one embodiment of the invention.

FIG. 8 depicts example steps for establishing and/or updating a profile in accordance with at least one embodiment of the invention. At step 802, an item user identify may be received. For example, the item customization client 102

(FIG. 1) may receive a name of the item user input through the user interface 402 (FIG. 4). At step 804, an item characterization may be received. The item customization client 102 may receive a characterization of the item 114 through the user interface 402. For example, the item characterization may be an identify of the item and/or item type to be customized. At step 806, a use goal characterization may be received. The item customization client 102 may receive a use goal characterization through the user interface 402. For example, the use goal characterization may indicate that the item is intended to contribute to a particular sports training goal.

At step 808, a use environment characterization may be received. The item customization client 102 (FIG. 1) may receive the use environment characterization through the user interface 402 (FIG. 4). For example, the use environment characterization may indicate one or more surfaces upon which a sports-related activity will occur (e.g., road, sidewalk, treadmill, trail, track, urban). At step 810, an activity duration characterization may be received. For example, the item customization client 102 may receive the activity duration characterization through the user interface 402. At step 812, an activity intensity characterization may be received. For example, the item customization client 102 may receive the activity intensity characterization through the user interface 402.

At step 814, a retiring item characterization may be received. The item customization client 102 (FIG. 1) may receive the retiring item characterization through the user interface 402 (FIG. 4). For example, the retiring item characterization may rate an item previously used during the activity. At step 816, an injury characterization may be received. For example, the item customization client 102 may receive the injury characterization through the user interface 402.

Figure 9:
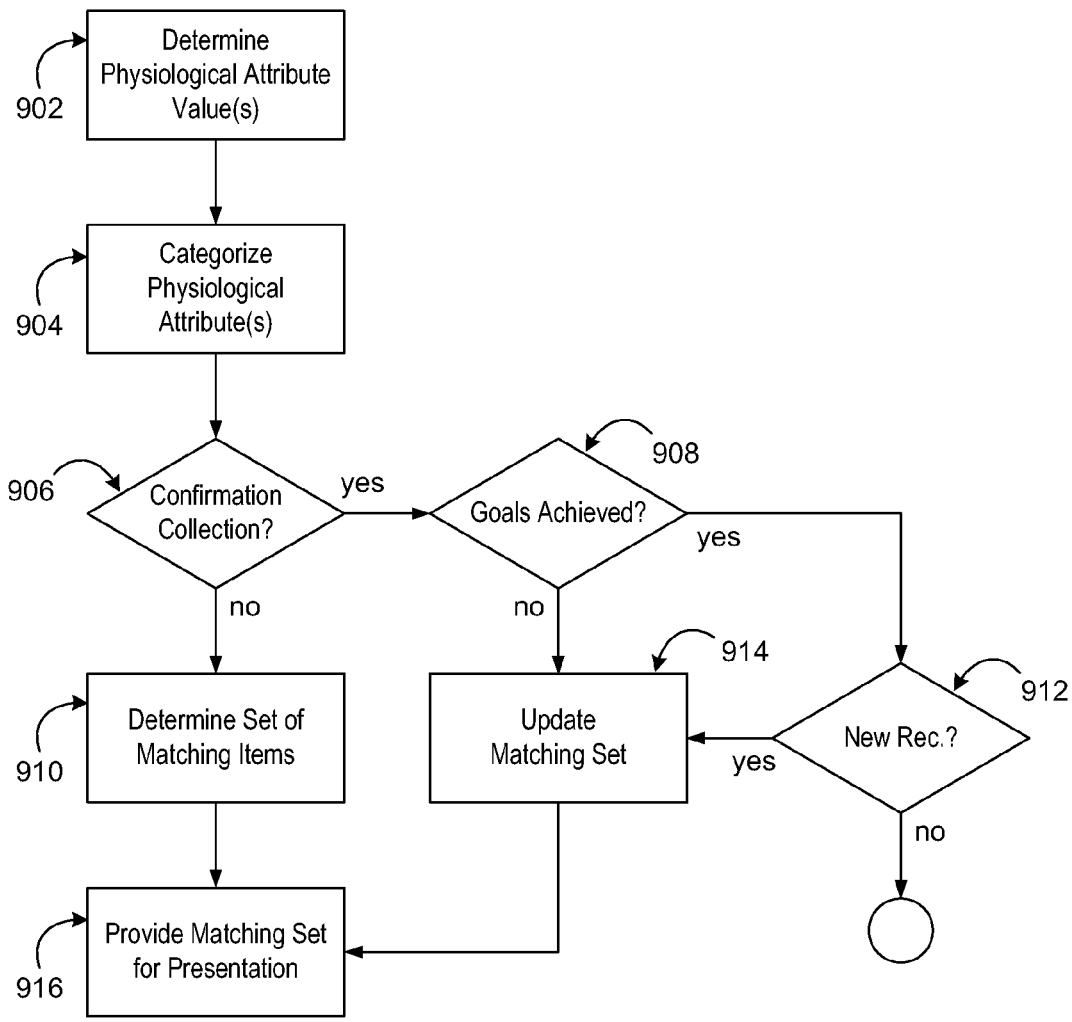
FIG. 9 is a flowchart depicting example steps for item customization in accordance with at least one embodiment of the invention.

FIG. 9 depicts example steps for item customization in accordance with at least one embodiment of the invention. At step 902, one or more physiological attribute values may be determined. For example, the sensor data analysis module 408 (FIG. 4) may determine the physiological attribute values based at least in part on collected sensor data. At step 904, one or more physiological attribute categorizations may be determined. For example, the sensor data analysis module 408 may determine the physiological attribute categorizations based at least in part on the values determined at step 902.

After an initial sensor data collection and customization session, the customer may return for one or more confirmation collection and customization sessions, for example, to confirm that specified use goals are being achieved and/or that the item 114 is optimally customized. At step 906, it may be determined whether this is such a confirmation session. For example, a user of the item customization client 102 (FIG. 1) may explicitly so indicate with the user interface 402 (FIG. 4). If it is determined that this is a confirmation session, a procedure incorporating step 906 may progress to step 908. Otherwise, the procedure may progress to step 910.

At step 910, a set of matching items may be determined. For example, the recommendation engine 414 (FIG. 4) may select the set of matching items from available items in the availability database 416 associated with categories that match the physiological attribute categories determined at step 904 and/or that match the characterizations of steps 804-616 of FIG. 8. If this is a confirmation session, at step 908, it may be determined whether specified use goals (e.g., of step 806) and/or one or more customization optimization metrics (e.g., running gait optimization) have been achieved. For example, the customization module 412 may compare the physiological attribute values of step 902 and/or the physiological attribute categories of step 904 to target values and/or categories. If the goal(s) have been achieved, the procedure may progress to step 912. Otherwise, the procedure may progress to step 914. If the goal(s) have been achieved, at step 912, it may be determined whether a new recommendation is desired, for example, responsive to item user indication. If so, the procedure may progress to step 914. Otherwise the procedure may exit (e.g., progress to steps not shown in FIG. 9 such as step 716 of FIG. 7).

At step 914, the set of matching items may be updated. For example, the recommendation engine 414 (FIG. 4) may update the set of matching items based on the physiological attribute values of step 902, the physiological attribute categories of step 904, the elimination of a previously chosen candidate, the degree to which the goals of step 908 were not be achieved, updated profile attributes (e.g., of step 710 of FIG. 7), and/or any suitable alternate matching progression module maintained by the recommendation engine 414. At step 916, the selected and/or updated matching set may be provided for presentation. For example, the user interface 402 may receive the (ranked) matching set from the recommendation engine 414, and may suitably format at least a portion of the matching set for presentation to the user of the item customization client 102 (FIG. 1).

As described above with reference to FIG. 4, item customization may include graphics and/or component customization. Accordingly, FIG. 10 also depicts example steps for item customization in accordance with at least one embodiment of the invention. At step 1002, one or more physiological attribute values may be determined. At step 1004, one or more physiological attribute categorizations may be determined. Steps 1002 and 1004 may correspond to steps 902 and 904 described above with reference to FIG. 9.

As described above with reference to FIG. 4, items may have customizable components associated with item component customization templates having one or more parameters that can be varied to customize the component. At step 1006, one or more values may be determined for the template parameter(s). For example, the item component customization module 422 may determine the parameter value(s) based at least in part on the physiological attribute values of step 1002, the physiological attribute categories of step 1004, and/or the profile characterizations of steps 704-516 (FIG. 7). At step 1008, one or more representations of the customized item component(s) may be provided. For example, the user interface 402 may depict the item component(s) as the item component(s) will appear when customized and/or the item component(s) will appear when integrated with the item based at least in part on the corresponding item component customization template(s) and the value(s) determined at step 1006. At step 1010, it may be determine whether the customization of the item component(s) is accepted. For example, the user of the item customization client 102 (FIG. 1) may so explicitly indicate through the user interface 402. If the customization is accepted, a procedure incorporating step 1010 may progress to step 1012. Otherwise, the procedure may progress to step 1014. At step 1014, one or more parameter value adjustments may be received, for example, through the user interface 402, and the procedure may return to step 1008 to provide an updated representation of the customized item component(s).

As described above with reference to FIG. 4, items may incorporate customized graphics associated with graphics templates having one or more parameters that can be varied to change an appearance of an associated graphic. At step 1012, one or more values may be determined for the template parameter(s). For example, the custom graphics generator 420 may determine the parameter value(s) based at least in part on the physiological attribute values of step 1002, the physiological attribute categories of step 1004, and/or the profile characterizations of steps 804-616 (FIG. 8). At step 1016, customized graphics may be generated. For example, the custom graphics generator 420 may generate the customized graphics based at least in part on the corresponding graphics template(s) and the value(s) determined at step 1012. At step 1018, the customized graphics may be provided for presentation, for example, with the user interface 402. At step 1020, it may be determined whether the customized graphics are accepted. For example, the item user may so explicitly indicate with the user interface 402. If the customized graphics are accepted, the procedure may exit (e.g., progress to steps not shown in FIG. 10 such as step 716 of FIG. 7). Otherwise, the procedure may progress to step 1022. At step 1022, a new graphics template selection may be received. For example, the item customization client 102 (FIG. 1) may receive the new graphics template selection through the user interface 402. Alternatively, the customization module 412 may select a next graphics template in a list of valid alternates, for example, as indicated by an entry for the item in the availability database 416. The procedure may then return to step 1016 to regenerate the personalized graphics.

Figure 11:
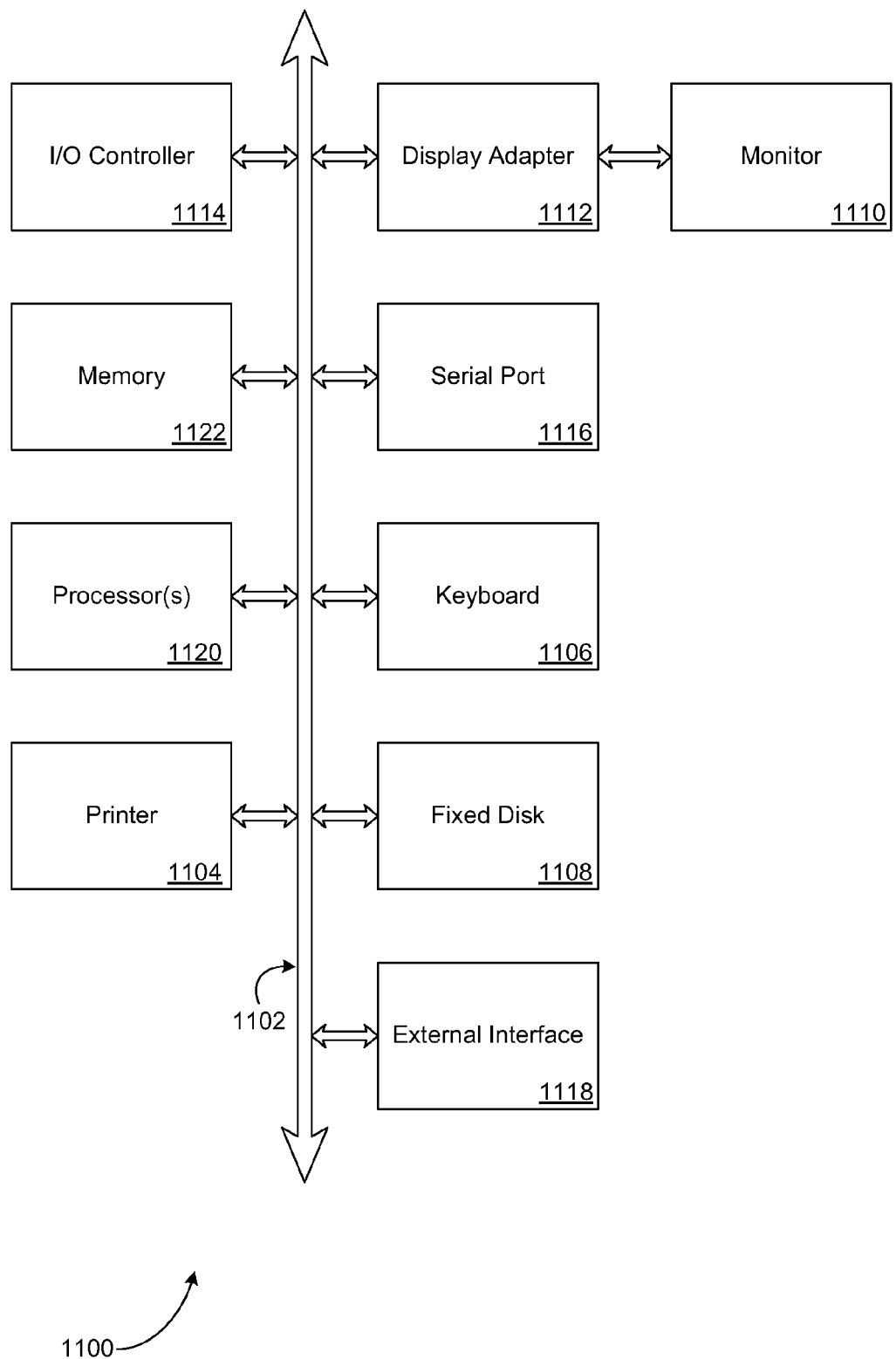
FIG. 11 is a schematic diagram depicting an example computer system in accordance with at least one embodiment of the invention.

In accordance with at least one embodiment, the system, apparatus, methods, processes and/or operations for item customization may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 11 depicts aspects of elements that may be present in a computer device and/or system 1100 configured to implement a method and/or process in accordance with at least one embodiment of the invention. The subsystems shown in FIG. 11 are interconnected via a system bus 1102. Additional subsystems such as a printer 1104, a keyboard 1106, a fixed disk 1108, a monitor 1110, which is coupled to a display adapter 1112. Peripherals and input/output (I/O) devices, which couple to an I/O controller 1114, can be connected to the computer system by any number of means known in the art, such as a serial port 1116 including a universal serial bus (USB) port. For example, the serial port 1116 or an external interface 1118 can be utilized to connect the computer device 1100 to further devices and/or systems not shown in FIG. 11 including the network 106 of FIG. 1, a mouse input device, and/or a scanner. The interconnection via the system bus 1102 allows one or more processors 1120 to communicate with each subsystem and to control the execution of instructions that may be stored in a system memory 1122 and/or the fixed disk 1108, as well as the exchange of information between subsystems. The system memory 1122 and/or the fixed disk 1108 may embody a tangible and non-transitory computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

That which is claimed is:

1. A computer-controlled method for customization of an item or product, the method comprising:

receiving, by a computer system, from at least one sensor apparatus, data characterizing at least one physiological attribute of at least one person, the data characterizing said at least one physiological attribute being based at least in part on data generated by said at least one sensor apparatus responsive to at least one activity performed by said at least one person, said at least one sensor apparatus being attached with said at least one person and thereby at least in part enabled to measure at least one physiological attribute correlate during said at least one activity, said at least one physiological attribute correlate utilized to determine said at least one physiological attribute of said at least one person;

receiving, by the computer system, at least one unique identifier associated with said at least one sensor apparatus;

generating, by the computer system, a customized graphic customized for said at least one person, the customized graphic based at least in part on the data characterizing said at least one physiological attribute received from said at least one sensor apparatus and associated with said at least one person based at least in part on said at least one unique identifier associated with said at least one sensor apparatus;

determining, by the computer system, a customized design of an item customized for said at least one person, the customized design of the item comprising the customized graphic on a surface of the item; and providing, by the computer system, the customized design to an item customization facility such that the item is customized for said at least one person by the item customization facility in accordance with the determined customized design including customizing the surface of the item with the customized graphic.

2. A computer-controlled method in accordance with claim 1, wherein the item customization facility comprises a presentation device and providing the customized design to the item customization facility comprises providing the customized design for presentation to said at least one person.

3. A computer-controlled method in accordance with claim 1, wherein said at least one activity comprises at least one sports-related activity.

4. A computer-controlled method in accordance with claim 1, wherein the receiving of the data characterizing said at least one physiological attribute and the generation of the customized graphic occur during the performance of said at least one activity.

5. A computer-controlled method in accordance with claim 4, wherein the data characterizing said at least one physiological attribute comprises a stream of data characterizing said at least one physiological attribute during the performance of said at least one activity and the customized graphic is repeatedly updated during the performance of said at least one activity based at least in part on the stream of data.

6. A computer-controlled method in accordance with claim 1, wherein said at least one person comprises a plurality of groups of people and the method further comprises determining a plurality of customized designs each corresponding to one of the plurality of groups, each of the plurality of customized designs comprising a customized graphic based at least in part on data characterizing at least one physiological attribute of the corresponding group of people.

7. A computer-controlled method in accordance with claim 1, wherein:

said at least one person comprises a plurality of people; and determining the customized design comprises determining a first customized design component that corresponds collectively to the plurality of people and determining a second customized design component that corresponds to an individual of the plurality of people, the first customized design component comprising a first customized graphic based at least in part on data characterizing at least one physiological attribute of the plurality of people, the second customized design component comprising a second customized graphic based at least in part on data characterizing at least one physiological attribute of the individual, the second customized graphic being different from the first customized graphic.

8. A computer-controlled method in accordance with claim 1, wherein:

the customized design comprises a set of design components including at least one design component associated with a set of customization parameters; and providing the customized design to the item customization facility comprises generating a customized design message including a name-value pair for each of the set of customization parameters.

9. A computer-controlled method in accordance with claim 1, wherein said at least one physiological attribute correlate comprises a time series and determining said at least one physiological attribute of said at least one person comprises statistically processing said time series.

10. A computer-controlled method in accordance with claim 1, wherein said at least one physiological attribute correlate comprises a time series of acceleration vectors and determining said at least one physiological attribute of said at least one person comprises applying a model of human physiology to the time series of acceleration vectors.

11. A computer-controlled method in accordance with claim 1, wherein said at least one physiological attribute correlate comprises a time series of acceleration vectors and determining said at least one physiological attribute of said at least one person comprises applying a human skeletal-muscular model to the time series of acceleration vectors.

12. A computer-controlled method in accordance with claim 1, wherein said processing to determine said at least one physiological attribute of said at least one person is performed at least in part by said at least one sensor apparatus.

13. A computer-controlled method in accordance with claim 1, wherein said at least one sensor apparatus is incorporated into at least one item of apparel worn by said at least one person thereby enabling at least in part said at least one sensor apparatus to be attached with said at least one person.

14. A computer-controlled system for item customization, the system comprising:

an item customization module having a structure adapted to, at least:

receive, from at least one sensor apparatus, data characterizing at least one physiological attribute of at least one person, the data characterizing said at least one physiological attribute being based at least in part on data generated by said at least one sensor apparatus responsive to at least one activity performed by said at least one person, said at least one sensor apparatus being attached with said at least one person and thereby at least in part enabled to measure at least one physiological attribute correlate during said at least one activity, said at least one physiological attribute correlate utilized to determine said at least one physiological attribute of said at least one person;

receive at least one unique identifier associated with said at least one sensor apparatus;

generate a customized graphic customized for said at least one person, the customized graphic based at least in part on the data characterizing said at least one physiological attribute received from said at least one sensor apparatus and associated with said at least one person based at least in part on said at least one unique identifier associated with said at least one sensor apparatus;

determine a customized design of an item customized for said at least one person, the customized design of the item comprising the customized graphic on a surface of the item; and provide the customized design to an item customization facility such that the item is customized for said at least one person by the item customization facility in accordance with the determined customized design including customizing the surface of the item with the customized graphic; and at least one processor configured to facilitate the item customization module.

15. A computer-controlled system in accordance with claim 14, further comprising at least one sensor apparatus communication component communicatively coupled with the item customization module and having a structure adapted at least to receive the data generated by said at least one sensor apparatus.

16. A computer-controlled system in accordance with claim 14, further comprising a presentation device communicatively coupled with the item customization module and configured at least to present the customized design to said at least one person.

17. A computer-controlled method for item customization, the method comprising:

receiving, by a computer system, from at least one sensor apparatus, data characterizing at least one physiological attribute of at least one person, the data characterizing said at least one physiological attribute being based at least in part on data generated by said at least one sensor apparatus responsive to at least one activity performed by said at least one person, said at least one sensor apparatus being attached with said at least one person and thereby at least in part enabled to measure at least one physiological attribute correlate during said at least one activity, said at least one physiological attribute correlate utilized to determine said at least one physiological attribute of said at least one person;

receiving, by the computer system, at least one unique identifier associated with said at least one sensor apparatus;

generating, by the computer system, a customized graphic customized for said at least one person, the customized graphic based at least in part on the data characterizing said at least one physiological attribute received from said at least one sensor apparatus and associated with said at least one person based at least in part on said at least one unique identifier associated with said at least one sensor apparatus;

determining, by the computer system, a customized design of an item customized for said at least one person, the customized design of the item comprising the customized graphic on a surface of the item; and providing, by the computer system, the customized design for presentation to said at least one person.

18. A computer-controlled method in accordance with claim 17, wherein:

the customized graphic on the surface of the item is associated with at least one parameter that modifies an appearance of the customized graphic; and determining the customized design includes determining at least one value for said at least one parameter based at least in part on the data characterizing said at least one physiological attribute.

19. A computer-controlled method in accordance with claim 18, wherein the customized graphic on the surface of the item is unique with respect to the data characterizing said at least one physiological attribute.

* * * * *